A. C. RECKER.
YIELDING TERMINAL CAP FOR DRY BATTERY CELLS.
APPLICATION FILED FEB. 28, 1921.
1,382,440.
Patented June 21, 1921.
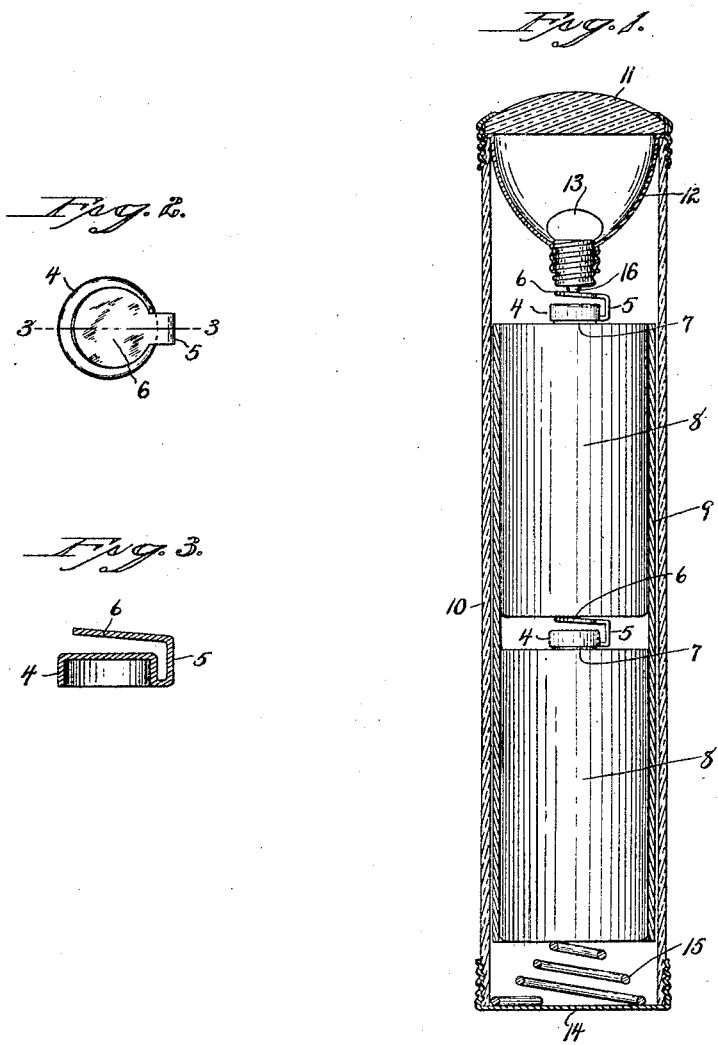
Inventor
Adolph C Recker
by Seymour & Earle
attys

UNITED STATES PATENT OFFICE.

ADOLPH C. RECKER, OF OAKVILLE, CONNECTICUT, ASSIGNOR TO THE CHASE COMPANIES INC., OF WATERBURY, CONNECTICUT, A CORPORATION.

YIELDING TERMINAL CAP FOR DRY-BATTERY CELLS.

1,382,440.    Specification of Letters Patent.    Patented June 21, 1921.

Original application filed September 20, 1919, Serial No. 325,211. Divided and this application filed February 28, 1921. Serial No. 448,690.

*To all whom it may concern:*

Be it known that I, ADOLPH C. RECKER, a citizen of the United States, residing at Oakville, in the county of Litchfield and State of Connecticut, have invented a new and useful Improvement in Yielding Terminal Caps for Dry-Battery Cells; and I do hereby declare the following, when taken in connection with the accompanying drawings and the characters of reference marked thereon, to be a full, clear, and exact description of the same, and which said drawings constitute part of this application, and represent, in—

Figure 1, a view in central longitudinal section of a two-cell battery-hand-lamp or flashlight, the cells of which are equipped with my improved yielding terminal-caps.

Fig. 2, an enlarged plan view of one of the caps.

Fig. 3, a sectional view thereof on the line 3—3 of Fig. 2.

My invention relates to an improved yielding terminal-cap for dry-battery cells, the object being to construct a terminal-cap with particular reference to improving the electrical connection, to minimizing the effect of corrosion, and to absorbing shocks and so avoiding the breakage of the delicate terminal of the lamp in case the battery is permitted to drop against the same of its own weight.

With these ends in view, my invention consists in a yielding terminal-cap adapted to be mounted upon the carbon electrode of a dry-battery cell and provided with a yielding, integral, overhanging contact-arm.

My invention further consists in a cap having certain details of construction as will be hereinafter described and pointed out in the claims.

As herein shown, my improved one-piece terminal-cap comprises a shallow, inverted, circular cup 4, having a bent arm 5 offsetting from its lower edge at a right angle thereto and turned upward at a right angle in a line parallel with the side wall of the cup and terminating in a circular spring contact-arm 6 overhanging the upper face of the cap to which it is normally inclined, as shown in Figs. 1 and 2. The cup 4 of the cap is adapted in internal diameter to fit snugly over the projecting end of the carbon electrode 7 of a dry-battery cell 8 of any approved character. The flashlight or battery hand-lamp shown has two such cells 8 inclosed within a paper tube 9 and located within the tubular case 10 of the lamp, which is furnished with the usual lens 11, reflector 12 and bulb 13, all located at one end of the case 10, while the opposite end thereof is furnished with a removable-cap 14 containing a coiled spring 15, which exerts a constant effort to move both of the cells outward, so as to maintain the contact-arm 6 of the terminal-cap on the electrode of the inner cell in active contact with the inner end of the outer cell and the corresponding arm 6 of the cap on the electrode of the outer cell in constant engagement with the terminal 16 of the bulb 13.

Yielding terminal-caps constructed in accordance with my invention improve the connection between the cell and lamp in case but one cell is used and also the connection between the cells in case a battery of cells is used, as shown in Fig. 1, when the contact-arms of the caps, on account of their tension, rub on the surfaces with which they are brought into contact and hence not only improve the electric connection but minimize the danger of corrosion. Moreover, these spring contact-arms not only act as auxiliaries of the main battery-spring at the bottom of an ordinary flashlight, but also act as buffers to absorb the shock, should the lamp be dropped head downward or should the case be held head downward and the cell or cells dropped into it, thus endangering the breakage of the delicate terminal of the lamp-bulb.

This application is a division of my prior application, filed September 20, 1919, Serial Number 325,211, which has matured into Patent 1,374,168 dated Apr. 5, 1921.

I claim:

1. A yielding terminal-cap for dry-battery cells, consisting of an inverted cup formed with a yielding integral contact-arm overhanging the upper face of the cup.

2. A yielding terminal-cap for dry-battery cells, consisting of an inverted cup formed with a yielding integral contact-arm overhanging the upper face of the cup and normally inclined at an angle with respect thereto.

3. In a battery hand-lamp or flashlight the combination with the tubular case and lamp-bulb thereof, of a plurality of dry-battery cells located within the said case, and yielding terminal-caps interposed between the adjacent cells and between the outermost cell and the terminal of the lamp-bulb, the said caps being made in one piece and each consisting of an inverted cup adapted to fit over the projecting ends of the battery electrodes and each cup being formed with a bent arm offsetting from its lower edge and merging into a yielding contact-arm overhanging its upper face and inclined with respect thereto.

In testimony whereof I have signed this specification in the presence of two subscribing witnesses.

ADOLPH C. RECKER.

Witnesses:
 JOHN S. NEAGLE,
 JOHN W. HAND.